United States Patent [11] 3,625,928

[72] Inventors Philippe Mornet
Pau;
Jean Teitgen, Arthez-de-Bearn; Gilbert Marie, Pau, all of France
[21] Appl. No. 751,044
[22] Filed Aug. 8, 1968
[45] Patented Dec. 7, 1971
[73] Assignee Societe Nationale Des Petroles D'Aquitaine Courbevoie, France
[32] Priority Aug. 9, 1967
[33] France
[31] 117338

[54] ACTIVATION OF OLEFIN POLYMERIZATION CATALYST
16 Claims, No Drawings
[52] U.S. Cl. .................................................. 260/88.2,
252/429 B, 260/80.78, 260/94.9 C
[51] Int. Cl. ....................................................... C08f 1/56,
C08f 15/04
[50] Field of Search ........................................... 260/88.2,
80.78, 94.9 C; 252/429 B

[56] References Cited
UNITED STATES PATENTS

| | | | |
|---|---|---|---|
| 3,220,995 | 11/1965 | Stogryn et al. | 260/93.7 |
| 2,843,577 | 7/1958 | Friedlander et al. | 260/94.9 |
| 3,301,834 | 1/1967 | Christman | 260/80.78 |
| 3,318,858 | 5/1967 | Nakaguchi et al. | 260/93.7 |
| 3,328,366 | 6/1967 | Nakaguchi et al. | 260/88.2 |
| 3,349,064 | 10/1967 | Gumbaldt et al. | 260/80.78 |
| 3,377,325 | 4/1968 | Loveless | 260/80.78 |
| 3,380,930 | 4/1968 | Miller | 252/429 |

FOREIGN PATENTS

| | | |
|---|---|---|
| 41/12,634 | 7/1966 | Japan |

Primary Examiner—Joseph L. Schofer
Assistant Examiner—Edward J. Smith
Attorney—Ostrolenk, Faber, Gerb & Soffen ABSTRACT: There is provided a novel class of activators for catalyst systems comprising a transition metal compound and a reducing agent suitably an aluminum alkyl or haloalkyl. There is also provided a novel catalyst system containing such activators. These activators are halosulfonyl and halosulfinyl heterocyclic compounds containing sulfur in the ring.

ACTIVATION OF OLEFIN POLYMERIZATION CATALYST

FIELD OF THE INVENTION

Catalysts for polymerizing olefins.

DESCRIPTION OF THE PRIOR ART

From the work carried out by Karl Ziegler, it is known to obtain polymers, copolymers and terpolymers of olefins and/or dienes by using catalysts which comprise a compound of the transition metals of the groups IV to VI of the periodic table of the elements, for example, titanium or vanadium, in addition to a reducing agent, for example, an organic aluminum compound. It is especially the halogenated derivatives of the titanium and vanadium which are used, but the aluminum alkyl halides are preferred as reducing agent. Similar catalysts, but more or less modified, are also known, which contain especially other organometallic compounds, for example, those of tin and an aluminum halide. The catalysts can optionally be fixed on appropriate supports. In all these cases, because of the presence of the metallic compounds in the reaction medium, the polymers which are obtained contain metallic constituents. These latter, even if present in fairly small contents, affect the physical properties, the resistance to oxidation under heat, the electrical resistance and other desired qualities of the polymers. In order to overcome this disadvantage, the quantity of metallic catalyst necessary has to be reduced, while preserving a high polymerization speed; accordingly, research has been carried out with more active catalysts or activators of already known catalysts. Thus, various catalysts have been proposed, and at the present time several substances are known, the addition of which to the Ziegler catalyst systems permits the period of activity of said systems to be prolonged. Such products are, for example, azo- organic and azoxy organic compounds, saturated or unsaturated, cyclic or acyclic halogenated hydrocarbons, quinones and benzene sulfonyl chloride. As halogenated hydrocarbons, pentachlorethane has been proposed; however, this only insignificantly increases the polymerization yield.

On the contrary, the process according to the invention enables the Ziegler or similar catalyst to be reactivated, solutions with relatively high contents of solid materials to be obtained and the polymerization yield to be improved, all this being achieved while reducing the quantity of metallic constituents present in the polymer and prejudicial to the properties of this latter.

SUMMARY OF THE INVENTION

The process for polymerizing olefins and/or dienes according to the invention, of the type in which the monomers are caused to react in the presence of a catalyst composition comprising a reducing agent, such as an organic compound of aluminum and/or of another metal, and a compound of the transition metals of the groups IV to VI of the Periodic System of the elements, is characterized in that the reaction medium has added thereto, as activator, a heterocyclic compound containing a sulfur atom in its ring and at least one halosulfonyl or halosulfinyl group attached as substituent to this ring.

DESCRIPTION OF THE PREFERRED EMBODIMENTS

The activator according to the invention can in particular be a compound such as benzthiophene, thiophene, thiotoluene or methyl thiophene, thionaphthene, thiophtene or other ring containing sulfur bonded to carbon atoms, this heterocyclic compound carrying at least one —SOX or —SO₂X group, in which X is a halogen, principally chlorine or bromine. Thus, the very active compounds according to the invention are, for example, the chlorosulfonyl thiophene Particularly suitable are the compounds of which the halosulfonyl or halosulfinyl group or groups are in the positions 4 or 2 and 4.

By the term "polymerization," there is also understood here a homopolymerization, as well as a copolymerization or ter-

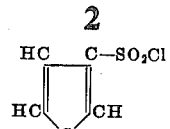

and the di-(chlorosulfonyl) thiophene

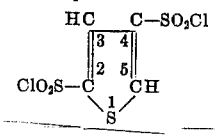

polymerization.

The process of the invention is applied with success to all the polymerization reactions of olefins and dienes and especially to the preparation of polyethylene, ethylene-propylene and ethylene-propylene-diene polymers.

The process of the invention is particularly efficient when the Ziegler catalyst contains a titanium compound and especially a vanadium compound.

Among the compounds of these two latter metals, it is the halides and the oxyhalides which are best suitable for carrying out the process of the invention, although others can be used.

As reducing agent, it is advantageous to employ an organic aluminum compound, particularly an aluminum alkyl and best of all an aluminum alkyl halide. However, it is to be understood that the process of the invention is also applicable in the case where the reducing agent is chosen from other reducing products, which are appropriate for carrying out the Ziegler polymerization process.

The quantities of activator being used can vary within wide limits, but it is necessary for the reaction medium to contain more organic aluminum compound, expressed as metallic aluminum, than it does of activator.

It is in particular possible to use about 5 to 50 moles and preferably about 10 to 20 moles of activator per atoms of transition metal, i.e., titanium or vanadium.

The conditions most favorable to the beneficial action of the activator are those in which the two fundamental constituents of the Ziegler catalyst are present in quantities which permit of obtaining an Al/V or Al/Ti ratio of about 40/1 to 50/1, and this ratio should not be smaller than about 10/1.

It is possible to use the constituents of the catalyst and the activator indifferent ways, by first of all mixing them before they are introduced into the reaction mixture, or by introducing them directly into the latter, for example, continuously, or even by first of mixing the vanadium or titanium salts and the activator.

The polymerization is effected in a suitable solvent and particularly in one or more optionally halogenated hydrocarbons; as nonlimiting examples, it is possible to mention hexane, heptane, octane, cyclohexane, benzene, trichlorethylene, ethyl chloride, etc.

The polymerization temperature can vary within a wide range, for example, between −50° and +100° C., but it will preferably be between −5° and +60° C.

The polymerization can be carried out either at atmospheric pressure or at higher pressures, for example, pressures which are between 1 and 20 kg./cm.².

The polymerization can in addition be conducted intermittently or continuously.

EXAMPLE 1

This example is given as a standard for comparison purposes.

In a reactor with a capacity of 1 liter, equipped with a condenser and a helical agitator, a thermometer tube, a tube for the introduction of gases below the liquid, surface of the liquid, a dropping funnel with cocks for the introduction of the activator solution and a dropping funnel for introducing the constituents of the preformed Ziegler catalyst, 700 ml. of purified cyclohexane are saturated for 20 minutes, at atmospheric pressure, by means of a charge which comprises 33 mol percent of ethylene and 66 mol percent of propylene, both of these being very pure. The total delivery of gas is 100 liters per hour. Without interrupting the introduction of the monomers, the catalyst formed from 0.1 millimole of $VOCl_3$ and 5 millimoles of aluminum ethyl sesquichloride is introduced. A raising of the temperature is noted.

After polymerizing for 20 minutes, no further absorption of gases is observed; a few ml. of ethanol are then added to destroy the remaining catalyst. The polymer is precipitated with the aid of an ethanol-acetone solution and the product obtained is dried at 60° C. under vacuum until the weight is constant. The weight of polymer thus collected is 6.3 g., which corresponds to an efficiency of 350 g. of polymer per gram of $VOCl_3$.

EXAMPLE 2

The operations of example 1 are repeated, but 1 millimole of 2,4-di-(chlorosulfonyl)-thiophene is added dropwise during 25 minutes.

The quantity of polymer obtained is then 23.5 g., which corresponds to an efficiency of 1,360 g. of polymer per gram of $VOCl_3$, that is to say, almost four times that of example 1, carried out according to the prior art.

EXAMPLE 3

The reaction is carried out in a 5-liter reactor containing 3.5 liters of cyclohexane.

The catalyst system is formed by mixing beforehand 0.245 millimoles of $VOCl_3$ with 12.15 millimoles of aluminum diethyl chloride.

2.45 millimoles of 2,4-di-(chlorosulfonyl)-thiophene are added dropwise as activator for 60 minutes. The other conditions are those of example 1.

The weight of polymer obtained is 105.7 g., i.e., an efficiency of 2,500.

EXAMPLE 4

A polymerization in accordance with the general procedure of the foregoing examples is carried out in a 5-liter reactor containing 3.5 liters of cyclohexane with 16 millimoles of ethyl aluminum sesquichloride, 0.35 millimoles of $VOCl_3$ and 7 millimoles of bis-(chlorosulfonyl)-thiophene (activator), introduced over a period of 60 minutes.

The quantity of polymer formed is 126.7 g., this corresponding to an efficiency of 2,100.

The product obtained contains 49.6 percent of ethylene and has a Mooney viscosity (ML4) of 70.

Its ash content is 0.14 percent.

EXAMPLE 5

The continuous polymerization is effected in a 20-liter reactor, containing 16 liters of purified cyclohexane.

The continuous delivery of the solvent is 12 l./hr. and the reaction temperature is 37°. The rate of gas flow is 100 l./hr., the ethylene and the propylene being injected in the volumetric ratio of propylene:ethylene = 1.2.

The reaction is initiated by an intermittent operation of 30 minutes, during which there are continuously introduced:

1.6 mm. of vanadium tetrachloride
64 mm. of ethyl aluminum sesquichloride
16 mm. of 2,4-di-(chlorosulfonyl)-thiophene as well as 200 l. of the gaseous mixture of the monomers.

A changeover to operating the reaction continuously is then carried out, during which there are injected, in 2 hours:

24 l. of cyclohexane
2.4 mm. of vanadium tetrachloride
96 mm. of ethyl aluminum sesquichloride
24 mm. of dichlorosulfonyl thiophene as well as 800 l. of the gaseous mixture of monomers.

The weight of polymer obtained is 805 g., i.e. an efficiency of 1,045.

The polymer obtained has the following characteristics:

| | |
|---|---|
| %$C_2H_4$ (molar) | 58.4 |
| ($\eta$) 135° in tetraline | 1.7589 |
| Mooney viscosity ML (1+4) | 70 |
| Dispersity ratio (GPC) Mw/Mn | 2.37 |

Vulcanization for half an hour at 160° C., the mixture being prepared according to the formula:

| | |
|---|---|
| Polymer | 100 parts |
| ZnO | 5 parts |
| HAF | 60 parts |
| Sulfur | 0.32 parts |
| Dicumyl peroxide | 2.7 parts |

The measured mechanical properties are:

| | |
|---|---|
| breaking strength | 235 kg./cm.$^2$ |
| modulus at 300% elongation | 170 kg./cm.$^2$ |
| elongation | 390% |
| hardness | 75 |
| rebound | 52 |

EXAMPLE 6

The polymerization is carried out in a 20-liter reactor which contains 16 liters of purified cyclohexane. The continuous supply of solvent is 12 l./hr.

The reaction temperature is 17°. The rate of gas flow is 400 l./hr. the ethylene and the propylene being injected in the volumetric ratio between propylene:ethylene = 0.9.

The reaction is initiated by an intermittent operation of 15 minutes, followed by continuous running for 1 hour 45 minutes.

During the two hours of reaction, there are injected:

2.65 mm. of vanadium oxytrichloride
65 mm. of diethyl aluminum chloride
24 mm. of dichlorosulfonyl thiophene and also 21 liters of cyclohexane and 800 liters of a gaseous mixture of the monomers.

The weight of polymer obtained is 920 g., i.e. and efficiency of 2,000.

The polymer obtained has the following characteristics:

| | |
|---|---|
| %$C_2H_4$ (molar) | 62 |
| 135° in tetraline | 2.1096 |
| Mooney viscosity ML (1+4) | 80 |
| Dispersity ratio (GPC) Mw/Mn | 2.61 | with the mechanical properties (measured under the same conditions as in example 5):

| | |
|---|---|
| breaking strength | 240 kg./cm.$^2$ |
| 300% modulus | 235 kg./cm.$^2$ |
| elongation | 310% |
| hardness | 82 |
| rebound | 55 |

EXAMPLE 7

The reaction is carried out in a 2-liter reactor and under an absolute pressure of 5 kg./cm.$^2$.

The effective volume of the reactor is 1.2 liters. The reaction is carried out at 40° C. The delivery of solvent is 6 l./hr., this corresponding to a residence time of 12 minutes.

In a reaction lasting one hour, there are injected into the reactor:

6 liters of cyclohexane
0.75 mm. of vanadium tetrachloride
26 mm. of ethyl aluminum sesquichloride
9 mm. of dichlorosulfonyl thiophene The weight of polymer obtained is 191 g., this corresponding to an efficiency of 1325.

The characteristics of the product obtained are:

| | |
|---|---|
| %C₂H₄ (molar) | 58 |
| 135° in tetraline | 2.7312 |
| Dispersity ratio (GPC) $\bar{M}w/\bar{M}n$ | 3.26 |

We claim:

1. Process for interpolymerizing olefins, in which ethylene and propylene are reacted in the presence of a catalyst system comprising:
   a. aluminum alkyl,
   b. a compound of vanadium, and
   c. an activator of the formula het—$(SO_nX)_q$ wherein het is benzthiophene, thiophene, methylthiophene, thionaphthalene or thiophtene, $q$ is 1 or 2, $n$ is 1 or 2, and X is halogen, wherein the proportion of the moles activator to gram atoms vanadium is about 5:1 to 50:1, the atomic ratio of Al/V is at least 10:1 and wherein the ratio of moles of activator to gram atoms of aluminum alkyl is less than 1:1.

2. The process of claim 1 wherein the interpolymerization takes place between −50° and +100° C. and at 1–20 kg./cm.².

3. The process of claim 1 wherein the vanadium compound is a chloride or oxychloride and wherein X is chlorine or bromine.

4. The process of claim 3 wherein the aluminum alkyl is aluminum dialkyl chloride or aluminum alkyl sesquichloride.

5. The process of claim 4 wherein the activator is 4-chlorosulfonyl thiophene.

6. The process of claim 4 wherein the activator is 2,4-di-(chlorosulfonyl)thiophene.

7. the process of claim 4 wherein the activator is chlorosulfinyl thiophene or di-(chlorosulfinyl)thiophene.

8. The process of claim 4 wherein the proportion of moles activator to gram atoms vanadium is about 10:1 to 20:1 and wherein the atomic ratio of Al/V is about 40/1 to 50/1.

9. The process of claim 1 wherein the polymerization is carried out in a solvent chosen from the hydrocarbons and chlorinated hydrocarbons.

10. The process of claim 9 wherein ethylene and propylene are copolymerized between −50° and +100° C. and at 1–20 kg./cm.², the aluminum alkyl is aluminum alkyl halide, the proportion of moles activator to gram atoms vanadium is about 10:1 to 20:1, and wherein the atomic ratio of Al/V is about 40/1 to 50/1.

11. A novel catalyst system comprising:
    a. aluminum alkyl,
    b. a compound of vanadium, and
    c. an activator of the formula het—$(SO_nX)_q$ wherein het is benzthiophene, thiophene, methylthiophene, thionaphthalene or thiophtene, $q$ is 1 or 2, $n$ is 1 or 2, and X is halogen,
wherein the proportion of moles activator to gram atoms vanadium is about 5:1 to 50:1, the atomic ratio of Al/V is at least 10:1 and wherein the ratio of moles of activator to gram atoms of aluminum alkyl is less than 1:1.

12. The catalyst system of claim 11 wherein the vanadium compound is a chloride or oxychloride and the aluminum alkyl iselected from the group consisting of aluminum dialkyl chloride and aluminum alkyl sesquichloride.

13. The catalyst system of claim 12 wherein the proportion of moles of activator to gram atoms of vanadium is about 10:1 to 20:1, and wherein the atomic ratio of Al/V is about 40/1 to 50/1.

14. The catalyst system of claim 13 wherein the activator is 4-chlorosulfonyl thiophene.

15. The catalyst system of claim 13 wherein the activator is 2,4-di-(chlorosulfonyl)thiophene.

16. The catalyst system of claim 13 wherein the activator is chlorosulfinyl thiophene or di-(chlorosulfinyl) thiophene.

* * * * *